United States Patent
Klubnik

(10) Patent No.: US 8,142,198 B2
(45) Date of Patent: Mar. 27, 2012

(54) METHOD FOR DEVELOPING FINE MOTOR SKILLS OF THE HAND

(75) Inventor: Melissa Klubnik, Hudson, OH (US)

(73) Assignee: Melissa Klubnik, Hudson, OH (US)

( * ) Notice: Subject to any disclaimer, the term of this patent is extended or adjusted under 35 U.S.C. 154(b) by 434 days.

(21) Appl. No.: 12/468,479

(22) Filed: May 19, 2009

(65) Prior Publication Data

US 2009/0291420 A1    Nov. 26, 2009

Related U.S. Application Data

(60) Provisional application No. 61/055,547, filed on May 23, 2008.

(51) Int. Cl.
*G09B 19/00* (2006.01)

(52) U.S. Cl. ........................................ 434/258

(58) Field of Classification Search .................. 434/156, 434/178, 236, 247, 258, 260, 433
See application file for complete search history.

(56) References Cited

U.S. PATENT DOCUMENTS

| | | | | |
|---|---|---|---|---|
| 1,544,645 | A * | 7/1925 | Johnson | 446/387 |
| 3,243,895 | A * | 4/1966 | Girard | 434/93 |
| 4,648,548 | A * | 3/1987 | Shin | 229/116.4 |
| 5,957,693 | A * | 9/1999 | Panec | 434/178 |
| 6,022,260 | A * | 2/2000 | Fritzel | 446/93 |
| 6,612,844 | B1 * | 9/2003 | Vallee | 434/156 |
| 2005/0034317 | A1 * | 2/2005 | Burandt et al. | 33/512 |
| 2006/0290132 | A1 * | 12/2006 | Silaprom | 281/5 |
| 2007/0048696 | A1 * | 3/2007 | Blank | 434/156 |
| 2009/0068621 | A1 * | 3/2009 | Schulken | 434/82 |

* cited by examiner

*Primary Examiner* — Kurt Fernstrom

(57) ABSTRACT

A method for developing fine motor skills of the hand, the method having the steps of manufacturing a fine-motor-skills-of-the-hand development workbook system that is made up of more than one workbook, wherein substantially all of the workbook pages are construction paper, and each of the workbooks are respectively made up of distinct printed subject matter and patterns; printing subject matter and patterns on each of the construction-paper pages that are to be inserted into each of the respective workbooks; inserting and binding the pre-printed construction-paper pages into each of the system's respective workbooks; and identifying and visually displaying each of the system's workbooks as having relatively different levels of complexity in the development of fine motor skills of the hand.

6 Claims, No Drawings

METHOD FOR DEVELOPING FINE MOTOR SKILLS OF THE HAND

RELATED APPLICATIONS

This application claims priority from U.S. Provisional Patent Application Ser. No. 61/055,547 filed May 23, 2008. The subject matter of Provisional Patent Application No. 61/055,547 is hereby incorporated into this application by reference.

BACKGROUND OF THE INVENTION

Methods for developing motor skills are known, and there remains a need in the art for methods directed to developing fine motor skills of the hand.

SUMMARY OF THE INVENTION

A method for developing fine motor skills of the hand, the method having the steps of manufacturing a fine-motor-skills-of-the-hand development workbook system that is made up of more than one workbook, wherein substantially all of the workbook pages are construction paper, and each of the workbooks are respectively made up of distinct printed subject matter and patterns; printing subject matter and patterns on each of the construction-paper pages that are to be inserted into each of the respective workbooks; inserting and binding the pre-printed construction-paper pages into each of the system's respective workbooks; and identifying and visually displaying each of the system's workbooks as having relatively different levels of complexity in the development of fine motor skills of the hand.

A method for developing fine motor skills of the hand, the method having the steps of manufacturing a fine-motor-skills-of-the-hand development workbook system that is made up of more than one workbook, wherein substantially all of the workbook pages are construction paper, and each of the workbooks are respectively made up of distinct printed subject matter and patterns; printing subject matter and patterns on a sheet of construction-paper; cutting the sheet of construction paper into two or more pages that are to be inserted into each of the respective workbooks; inserting and binding the construction-paper pages into each of the system's respective workbooks; and identifying and visually displaying each of the system's workbooks as having relatively different levels of complexity in the development of fine motor skills of the hand.

DETAILED DESCRIPTION OF THE INVENTION

Generally provided is a method for developing fine motor skills of the hand by using scissors and a workbook system that includes a plurality of workbooks that are identified as both having and containing printed cutting patterns of graduated levels of difficulty or complexity. In an embodiment, a particular workbook of a workbook system has cutting patterns that are only within a qualified level of difficulty. In another embodiment, a workbook of a first level of difficulty contains only those cutting patterns that are qualified as being within the scope of this first level of difficulty; a workbook of a second level of difficulty contains only those cutting patterns that are qualified as being within the scope of this second level of difficulty; a workbook of a third level of difficulty contains only those cutting patterns that are qualified as being within the scope of this third level of difficulty; and a workbook of a fourth level of difficulty contains only those cutting patterns that are qualified as being within the scope of this fourth level of difficulty. An embodiment provides for the immediately preceding pattern to perpetuate as a function of the number of workbooks in a workbook system. Language directed to describing levels of difficulty is provided herein.

Fine motor skills can be defined as the coordination of small muscle movements which occur, e.g., in the fingers, usually in coordination with the eyes. Embodiments of this workbook system are directed to improving fine motor skills of the hand by increasing the relative difficulty or complexity of the cutting patterns in each workbook as the user graduates from one workbook level of difficulty to the next. Embodiments of this workbook system are also directed to exercising and strengthening the extrinsic and intrinsic muscle groups of a user's hand. Embodiments provide for using scissors; a pricking/punching tool; or a combination thereof to cut, prick, or punch the patterns in a particular workbook or workbook system. A hand's extrinsic muscle groups can generally be understood to be those muscle groups that are considered to be the long flexors and extensors. But a hand's intrinsic muscle groups, can generally be understood to include the: thenar, hypothenar, interosseus, and lumbrical muscles.

Additional embodiments provide for using the workbook system as a pre-writing exercise, a teacher solution for abstract or concrete art, a stroke/accident victim therapy tool for hand strength, an art activity program to teach subject matter to the blind, a kinesthetic art activity, a scissor introduction/refinement tool, a pricking/punching introduction/refinement tool, an Academic Art Activity tool system, and as therapy for users generally suffering from: Alzheimer's, multiple sclerosis, cerebral palsy, carpal tunnel, mental handicaps, visual impairment, or combinations thereof.

Workbooks can be understood in their ordinary sense, and embodiments provide for workbooks having a plurality of pages. Additional embodiments are directed to the workbooks having about 40 pages. Persons of ordinary skill in the art will be able to select useful numbers of workbook pages without having to exercise undue experimentation.

Useful dimensions of workbook pages can be determined by those of ordinary skill in the art without having to exercise undue experimentation. There are no limitations directed to useful workbook-page characteristic dimensions for any of the embodiments. As non-limiting examples, useful characteristic dimensions of workbook pages include: 26"×37"; 6"×9"; 8.5"×11"; 9"×12"; 18"×12"; 11"×14"; 22"×28"; 24"×36"; and 16"×24".

The printed subject matter or cutting patterns on the workbook pages can be any kind of printed visual marking. Embodiments provide for the cutting patterns to include characters, symbols, or markings of any known language. Additional embodiments are directed to the cutting patterns having aesthetic designs. As a non-limiting embodiment, useful aesthetic designs include: curved lines, wavy lines, zig-zag lines, polygons, stars, ellipses, ellipsoids, ovals, octagons, pentagons, squares, circles, crescents, hearts, diamonds, triangles, rectangles. Additional non-limiting embodiments include aesthetic designs resembling: machines, motorcycles, cars, buses, ships, planes, animals, dolphins, star fish, fish, seaweed, coral, sharks, whales, chickens, butterflies, frogs, and plants. Additional non-limiting embodiments include aesthetic designs generally related to math concepts: tangrams, fractions, geometric shapes, and short beads. Even more non-limiting embodiments include aesthetic designs generally related to science and geography: landforms, solar systems, maps, images of the Earth, red rods, and brown stairs. Any of the above-described printed subject matter or cutting patterns can be used alone or in combination, and persons of ordinary skill in the art will be able to select useful printed subject matter, cutting patterns, or combinations thereof without having to exercise undue experimentation.

Any number of workbooks can be used to make up a particular workbook system. Embodiments provide for 1, 2, 3, 4, 5, 6, 7, 8, 9, or 10 workbooks to be included any one workbook system. In certain embodiments, and regardless of the number of workbooks included in any particular workbook system, each of a system's workbooks will be identified as having a distinct level of cutting-pattern complexity relative to the system's other workbooks. In further embodiments, no two system workbooks will either be identified or include cutting patterns that are qualified as having a complexity that is the same. Stated differently, each of the workbooks in any one particular workbook system will be identified as and include cutting patterns identified as having different levels of complexity. An embodiment provides for a workbook's difficulty-level visual indicator to be located at least on an external surface of the workbook.

Embodiments provide for the workbooks having workbook pages manufactured from construction paper. Construction paper can be understood in its ordinary sense and is well known to those of ordinary skill in the art. Any known form of construction paper can be used, and non-limiting examples of construction paper include ground wood, heavy weight, and sulfite forms.

Persons of ordinary skill in the art will be able to print on construction paper using known methods. An embodiment provides for printing designs, cutting patterns, or combinations thereof on construction paper.

Another embodiment provides for additionally printing tick marks on or close to the edge of the construction paper in order to identify where the construction paper is to be subsequently cut or sliced in the next step or phase of the manufacturing process. Persons of ordinary skill in the art can identify useful locations for placing the tick marks during the manufacturing process without having to exercise undue experimentation. There are no limitations directed to spacing between the tick marks, and embodiments provide for spacing the tick marks at intervals ranging from every 2" to 12"; 4" to 12"; 6" to 12"; 8" to 12". Other embodiments provide for spacing the tick marks at least 2" apart; at least 4" apart; at least 6" apart; at least 8" apart; or at least 10" apart.

During the manufacturing process, embodiments provide for printing on construction paper by using a commercial sized printer that has a high-volume commercial-sized drum and roller. Standard office copiers are typically not capable of being used during the manufacturing process because of the thickness of the construction paper.

Any size of construction paper can be printed upon, and persons of ordinary skill in the art will be able to select useful dimensions without having to exercise undue experimentation. Non-limiting embodiments of useful dimensions of construction paper being printed upon include: 26"×37"; 6"×9"; 8.5"×11"; 9"×12"; 18"×12"; 11"×14"; 22"×28"; 24"×36"; and 16"×24".

An embodiment provides for printing on a relatively larger sheet or sheets of construction-paper, and then cutting or slicing the relatively larger sheet or sheets of construction paper into relatively smaller sheets to be used in a workbook or workbooks.

There is no limitation on the number of images or cutting patterns that can be printed on a sheet of paper during the manufacturing process. An embodiment provides for any number of cutting patterns to be printed on a sheet of paper during the manufacturing process. Other embodiments provide for printing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 cutting patterns on a sheet of paper during the manufacturing process.

Embodiments provide for manufacturing the workbook sheets by performing at least the following steps of printing a plurality of cutting patterns onto a single sheet of paper during the manufacturing process and then subsequently cutting the single sheet of paper into more than one relatively smaller sheets of paper.

In those embodiments that include the step of cutting the single sheet of construction paper into a plurality of relatively smaller sheets of paper, embodiments provide for the single sheet of construction paper having useful characteristic dimensions that can be determined by a person of ordinary skill in the art without having to exercise undue experimentation. As a non-limiting example, the single sheet of construction paper can have characteristic dimensions of 26"×37". As non-limiting examples, the relatively smaller sheets of paper may have characteristic dimensions of: 9"×12"; 6"×9"; 18"×12"; or 11"×14".

Embodiments provide for a worksheet's cutting pattern or patterns being made up of any kind of printed line known in the art. Embodiments provide for consistently using the same types of lines as a function of the qualified level of difficulty that has been associated with the workbook or the cutting pattern or patterns. Furthermore, embodiments provide for a workbook to consistently use the same type of line or lines throughout the workbook. Other embodiments provide for a single workbook having a plurality of cutting patterns of different qualified levels of difficulty, wherein different types of lines are respectively used to describe cutting patterns of different qualified levels of difficulty.

In an embodiment, and within a workbook system, the thickness and type of lines used in a particular workbook will vary as a function of the qualified level of difficulty that has been associated with a particular workbook. In an embodiment, the width of the lines used to create a workbook system's cutting patterns will decrease as the relative qualified level of difficulty for each of the workbooks increases. In an embodiment, the length of the dashes of the dotted lines used to create a workbook system's cutting patterns will decrease as the relative qualified level of difficulty for each of the workbooks increases. An embodiment is also directed to a combination of the two immediately above line embodiments respectively relating to widths and lengths.

An embodiment also provides for visually indicating qualified levels of difficulty using different types of lines, color, or a combination thereof.

Additional embodiments provide for constructing three-dimensional objects, games, or puzzles using construction paper that has printed lines, different colors, or a combination thereof. In manufacturing three-dimensional objects from construction paper, a construction paper's printed lines, different colors, or a combination thereof assist a user in determining where to cut, fold, or attach the subject construction paper to another substrate. Nonlimiting examples of three-dimensional objects, games, or puzzles that can be manufactured using construction paper that has printed lines, different colors, or a combination thereof include: tangrams (puzzle that uses colors, patterns, or both to teach reasoning); fraction cubes (color association used to obtain recall recognition of fractional dimensions); geometric solids (basic shapes of the three-dimensional world that teach geometry); blue and red rods (mathematical rods that teach the dimensions of numbers through color association); brown stairs (three-dimensional blocks that children develop visual discrimination of width [breadth] with sets of crafted hardwood prisms); short bead stairs (three-dimensional beings that use color association to teach addition and subtraction); and world map (use color association to teach the maps of the world).

Embodiments provide for using any known combination of colors in association with various printed subject matter schemes. Nonlimiting embodiments include: using primary colors for basic schemes, using colors found in nature for science-related schemes; and using blue, red, green, yellow, white, purple, pink, or combinations thereof for math-related schemes. Any known colors or combination of colors can be used. Nonlimiting examples of useful colors include: yellow orange, yellow, spring green, green, emerald green, dark green, holiday green, turquoise/blue-green, light blue, blue, dark blue, violet, light violet, magenta, pink, raspberry, red, holiday red, scarlet, orange, natural, brown, dark brown, light brown, bright white, gray, and black.

In particular workbook-system embodiments, as the qualified level of difficulty for each of the workbooks increases, and both the relative widths and dash lengths (for dotted lines) decreases, the user will need to exercise increased fine-motor-skill and accuracy due to the decreased margin for error. Therefore, with respect to cutting, an embodiment provides that as the qualified levels increase in difficulty, the margin for error for accurately cutting out the cutting patterns decreases.

An embodiment provides for any of the lines described herein to be embossed. Embossing allows for any of the embodiments or combinations of embodiments provided herein to be used by the visually impaired.

An embodiment provides for a first qualified level of difficulty that uses dashed lines. ; a second qualified level of difficulty that uses dashed or dotted lines having relatively smaller widths than those used in the first qualified level of difficulty; and a third qualified level of difficulty that uses dashed or dotted lines having relatively smaller widths than those used in the second qualified level of difficulty.

In an embodiment, the relative complexity of cutting patterns can be understood as being a function of the sum of a cutting pattern's line lengths. In still another embodiment, the relative complexity of a cutting pattern can be understood as being a function of a cutting pattern's line lengths, line thicknesses, shades of color, texture, or combinations thereof. In another embodiment, the relative complexity of cutting patterns can be understood as being a function of the sum of the cutting pattern's line lengths or widths. In yet another embodiment, the relative complexity of cutting patterns can be understood as being a function of the dash lengths, for a cutting pattern's dotted lines. In still another embodiment, the relative complexity of cutting patterns can be understood as being a function of the combination of two or more of the immediately above embodiments.

Embodiments provide for a first qualified level of difficulty using approximately 9-inch lines to describe shapes that are no smaller than 3"×4". Another embodiment provides for a second qualified level of difficulty using approximately 4-inch lines to describe shapes smaller than 3"×4". Still another embodiment provides for a third qualified level of difficulty using approximately less than four-inch lines to describe shapes smaller than 2"×2".

An embodiment provides for the difficulty or complexity of a workbook system's cutting patterns increasing as the value of the workbook's difficulty-level visual indicator changes. In a non-limiting example, the workbook's difficulty-level visual indicator is a number, color, letter, or a combination thereof.

Methods for manufacturing workbooks are well-known, and persons of ordinary skill in the article be up to manufacture workbooks without having to exercise undue experimentation.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described. This invention has been described in detail with reference to specific embodiments thereof, including the respective best mode for carrying out each embodiment. It shall be understood that these illustrations are by way of example and not by way of limitation.

What is claimed is:

1. A method for developing fine motor skills of the hand, the method comprising the steps:
    manufacturing a fine-motor-skills-of-the-hand development workbook system that is made up of more than one workbook, wherein substantially all of the workbook pages are construction paper, and each of the workbooks are respectively made up of distinct printed subject matter and patterns;
    printing subject matter and patterns on each of the construction-paper pages that are to be inserted into each of the respective workbooks;
    inserting and binding the pre-printed construction-paper pages into each of the system's respective workbooks;
    identifying and visually displaying each of the system's workbooks as having relatively different levels of complexity in the development of fine motor skills of the hand;
    wherein the printed images are defined by broken lines; and
    wherein the broken lines have a line width that decreases, relative to the line widths in the other workbooks, as the identified complexity of the workbooks increases.

2. A method for developing fine motor skills of the hand, the method comprising the steps:
    manufacturing a fine-motor-skills-of-the-hand development workbook system that is made up of more than one workbook, wherein substantially all of the workbook pages are construction paper, and each of the workbooks are respectively made up of distinct printed subject matter and patterns;
    printing subject matter and patterns on each of the construction-paper pages that are to be inserted into each of the respective workbooks;
    inserting and binding the pre-printed construction-paper pages into each of the system's respective workbooks;
    identifying and visually displaying each of the system's workbooks as having relatively different levels of complexity in the development of fine motor skills of the hand;
    wherein the printed images are defined by broken lines; and
    wherein each of the individual broken-lines have longitudinal lengths running in the direction of the broken line that decrease, relative to the broken-line lengths in the other workbooks, as the identified complexity of the workbooks increases.

3. A method for developing fine motor skills of the hand, the method comprising the steps:
    manufacturing a fine-motor-skills-of-the-hand development workbook system that is made up of more than one workbook, wherein substantially all of the workbook pages are construction paper, and each of the workbooks are respectively made up of distinct printed subject matter and patterns;

printing subject matter and patterns on each of the construction-paper pages that are to be inserted into each of the respective workbooks;

inserting and binding the pre-printed construction-paper pages into each of the system's respective workbooks;

identifying and visually displaying each of the system's workbooks as having relatively different levels of complexity in the development of fine motor skills of the hand;

wherein the printed images are defined by broken lines; and wherein the sum of the broken-line lengths that make up a printed image increase as the identified complexity of the workbooks increases.

4. A method for developing fine motor skills of the hand, the method comprising the steps:

manufacturing a fine-motor-skills-of-the-hand development workbook system that is made up of more than one workbook, wherein substantially all of the workbook pages are construction paper, and each of the workbooks are respectively made up of distinct printed subject matter and patterns;

printing subject matter and patterns on a sheet of construction-paper;

cutting the sheet of construction paper into two or more pages that are to be inserted into each of the respective workbooks;

inserting and binding the construction-paper pages into each of the system's respective workbooks;

identifying and visually displaying each of the system's workbooks as having relatively different levels of complexity in the development of fine motor skills of the hand;

wherein the printed images are defined by broken lines; and wherein the broken lines have a line width that decreases, relative to the line widths in the other workbooks, as the identified complexity of the workbooks increases.

5. A method for developing fine motor skills of the hand, the method comprising the steps:

manufacturing a fine-motor-skills-of-the-hand development workbook system that is made up of more than one workbook, wherein substantially all of the workbook pages are construction paper, and each of the workbooks are respectively made up of distinct printed subject matter and patterns.

printing subject matter and patterns on a sheet of construction-paper;

cutting the sheet of construction paper into two or more pages that are to be inserted into each of the respective workbooks;

inserting and binding the construction-paper pages into each of the system's respective workbooks;

identifying and visually displaying each of the system's workbooks as having relatively different levels of complexity in the development of fine motor skills of the hand;

wherein the printed images are defined by broken lines; and wherein each of the individual broken-lines have longitudinal lengths running in the direction of the broken line that decrease, relative to the broken-line lengths in the other workbooks, as the identified complexity of the workbooks increases.

6. A method for developing fine motor skills of the hand, the method comprising the steps:

manufacturing a fine-motor-skills-of-the-hand development workbook system that is made up of more than one workbook, wherein substantially all of the workbook pages are construction paper, and each of the workbooks are respectively made up of distinct printed subject matter and patterns;

printing subject matter and patterns on a sheet of construction-paper;

cutting the sheet of construction paper into two or more pages that are to be inserted into each of the respective workbooks;

inserting and binding the construction-paper pages into each of the system's respective workbooks;

identifying and visually displaying each of the system's workbooks as having relatively different levels of complexity in the development of fine motor skills of the hand;

wherein the printed images are defined by broken lines; and wherein the sum of the broken-line lengths that make up a printed image increase as the identified complexity of the workbooks increases.

* * * * *